United States Patent
Dani et al.

(10) Patent No.: US 10,351,442 B2
(45) Date of Patent: Jul. 16, 2019

(54) FLOW CONTROL DEVICE FOR FILTER AS YOU POUR SYSTEM

(71) Applicant: BRITA LP, Oakland, CA (US)

(72) Inventors: Nikhil P. Dani, Pleasanton, CA (US); Jonathan McDonald, Danville, CA (US); Nicole Doan, Danville, CA (US); Jonathan Taylor Wiegele, Venice, CA (US)

(73) Assignee: Brita LP, Oakland, CA (US)

( * ) Notice: Subject to any disclaimer, the term of this patent is extended or adjusted under 35 U.S.C. 154(b) by 0 days.

(21) Appl. No.: 15/039,002

(22) PCT Filed: Dec. 8, 2014

(86) PCT No.: PCT/US2014/069037
§ 371 (c)(1),
(2) Date: May 24, 2016

(87) PCT Pub. No.: WO2015/094747
PCT Pub. Date: Jun. 25, 2015

(65) Prior Publication Data
US 2016/0376163 A1  Dec. 29, 2016

Related U.S. Application Data

(63) Continuation-in-part of application No. 14/132,134, filed on Dec. 18, 2013.
(Continued)

(51) Int. Cl.
*C02F 1/00* (2006.01)
*C02F 1/42* (2006.01)
(Continued)

(52) U.S. Cl.
CPC .......... *C02F 1/003* (2013.01); *B01D 29/0097* (2013.01); *B01D 35/30* (2013.01);
(Continued)

(58) Field of Classification Search
CPC .......... C02F 1/002; C02F 1/003; C02F 1/283; C02F 2307/07; C02F 2201/006;
(Continued)

(56) References Cited

U.S. PATENT DOCUMENTS

| 313,320 | A | * | 3/1885 | Goodale | F25D 3/08 |
| | | | | | 222/130 |
| 619,569 | A | | 2/1899 | Hewel | |

(Continued)

FOREIGN PATENT DOCUMENTS

| CA | 2874153 A1 | 6/2015 |
| CA | 2933185 A1 | 6/2015 |

(Continued)

OTHER PUBLICATIONS

Supplementary European Search Report EP 14871701.0, dated Jun. 8, 2017.
(Continued)

*Primary Examiner* — Terry K Cecil
(74) *Attorney, Agent, or Firm* — Thomas C. Feix

(57) ABSTRACT

The invention relates to filter-as-you-pour water filtration container systems. Such a system may include a container body, an outlet through which water within the container body may be poured and simultaneously filtered, a lid that may be releasably attachable over the container body, and a filter assembly attachable to at least one of the lid or the container body. The filter assembly may be disposed so as to be in a flow stream of the water, as the water is poured out of the container body through an outlet of the system, so that the stream of water exiting through the outlet is simultaneously filtered as it is poured from the container body. The system may further include a flow control device (e.g., a
(Continued)

valve, grating, screen, etc.) disposed proximate (e.g., in or over) the outlet to regulate an exit flow rate of water being poured through the outlet.

24 Claims, 13 Drawing Sheets

Related U.S. Application Data

(60) Provisional application No. 61/940,101, filed on Feb. 14, 2014.

(51) Int. Cl.
    *C02F 1/28* (2006.01)
    *B01D 35/30* (2006.01)
    *B01D 29/00* (2006.01)
    C02F 101/12 (2006.01)
    C02F 101/20 (2006.01)
    A45F 3/16 (2006.01)

(52) U.S. Cl.
    CPC .... *A45F 2003/163* (2013.01); *B01D 2201/16* (2013.01); *C02F 1/283* (2013.01); *C02F 2101/12* (2013.01); *C02F 2101/20* (2013.01); *C02F 2201/005* (2013.01); *C02F 2201/006* (2013.01); *C02F 2303/185* (2013.01); *C02F 2307/04* (2013.01)

(58) Field of Classification Search
    CPC .............. C02F 2307/04; C02F 2101/12; C02F 2101/20; C02F 2303/185; C02F 1/42; C02F 2103/06; C02F 2209/40; C02F 2307/02; C02F 1/688; C02F 2201/005; B01D 35/30; B01D 29/114; B01D 2201/16; B01D 27/00; B01D 29/0097; A47J 31/605; B67D 2210/0001; B67D 3/0019; B67D 3/0051; A45F 2003/163
    USPC ......................... 210/464, 466, 467, 468, 469
    See application file for complete search history.

(56) References Cited

U.S. PATENT DOCUMENTS

| | | | |
|---|---|---|---|
| 1,074,168 A * | 9/1913 | Feinstein | A47J 31/14 222/189.07 |
| 2,689,048 A | 9/1954 | Powers | |
| 3,016,984 A | 1/1962 | Getzin | |
| 3,497,069 A | 2/1970 | Lindenthal et al. | |
| 3,535,852 A | 10/1970 | Hirs | |
| 3,554,377 A | 1/1971 | Miller | |
| 3,662,780 A | 5/1972 | Marsh | |
| 4,066,551 A | 1/1978 | Stern | |
| 4,154,688 A | 5/1979 | Pall | |
| 4,259,096 A | 3/1981 | Nakamura et al. | |
| 4,605,499 A | 8/1986 | Wise | |
| 4,696,742 A | 9/1987 | Shimazak | |
| 4,764,274 A | 8/1988 | Miller | |
| 4,921,600 A | 5/1990 | Meissner | |
| 4,948,499 A | 8/1990 | Peranio | |
| 4,983,288 A | 1/1991 | Karbachsch et al. | |
| 5,061,367 A | 10/1991 | Hatch et al. | |
| 5,076,922 A | 12/1991 | DeAre | |
| 5,106,501 A | 4/1992 | Yang et al. | |
| 5,122,270 A | 6/1992 | Ruger et al. | |
| 5,202,183 A | 4/1993 | Hosako et al. | |
| 5,225,078 A | 7/1993 | Polasky et al. | |
| 5,595,659 A | 1/1997 | Huang et al. | |
| 5,609,759 A * | 3/1997 | Nohren, Jr. | C02F 1/003 210/266 |
| 5,681,463 A | 10/1997 | Shimizu et al. | |
| 5,736,045 A | 4/1998 | Bies et al. | |
| 5,904,854 A | 5/1999 | Shmidt et al. | |
| 5,919,365 A | 7/1999 | Collette | |
| 5,980,743 A | 11/1999 | Bairischer | |
| 6,004,460 A | 12/1999 | Palmer et al. | |
| 6,161,710 A * | 12/2000 | Dieringer | A61J 11/001 215/11.4 |
| 6,189,436 B1 | 2/2001 | Brooks | |
| 6,193,886 B1 | 2/2001 | Nohren, Jr. | |
| 6,200,471 B1 * | 3/2001 | Nohren, Jr. | C02F 1/003 210/184 |
| 6,368,506 B1 | 4/2002 | Gebert et al. | |
| 6,383,381 B1 | 5/2002 | O'Flynn et al. | |
| 6,435,209 B1 | 8/2002 | Heil | |
| 6,565,743 B1 | 5/2003 | Poirier et al. | |
| 6,569,329 B1 | 5/2003 | Nohren, Jr. | |
| 6,589,904 B1 | 7/2003 | Iwasaki et al. | |
| 6,599,427 B2 | 7/2003 | Nohren et al. | |
| 6,733,669 B1 | 5/2004 | Crick | |
| 7,473,362 B1 | 1/2009 | Nohren, Jr. | |
| 7,828,969 B2 | 11/2010 | Eaton et al. | |
| 8,051,989 B1 | 11/2011 | Tondreau | |
| 8,080,160 B2 | 12/2011 | Yanou et al. | |
| 8,133,525 B2 | 3/2012 | Skalski et al. | |
| 8,419,818 B2 | 4/2013 | Page | |
| 9,511,315 B2 | 12/2016 | Cur et al. | |
| 10,035,713 B2 | 7/2018 | Dani et al. | |
| 2001/0035094 A1 | 11/2001 | Takagaki et al. | |
| 2002/0020673 A1 | 2/2002 | Nohren et al. | |
| 2002/0060176 A1 | 5/2002 | Mierau et al. | |
| 2002/0066700 A1 | 6/2002 | Dolfel et al. | |
| 2002/0083841 A1 | 7/2002 | Chaouachi et al. | |
| 2002/0166811 A1 | 11/2002 | Walker et al. | |
| 2005/0279768 A1 | 12/2005 | Chatrath | |
| 2006/0144781 A1 | 7/2006 | Carlson et al. | |
| 2007/0007296 A1 | 1/2007 | Guyot | |
| 2007/0095758 A1 | 5/2007 | Bortun et al. | |
| 2008/0128364 A1 | 6/2008 | Cloud et al. | |
| 2008/0274312 A1 | 11/2008 | Schelling et al. | |
| 2009/0039028 A1 | 2/2009 | Eaton et al. | |
| 2009/0139926 A1 | 6/2009 | Hassebrauck | |
| 2009/0184042 A1 | 7/2009 | Steed et al. | |
| 2010/0170839 A1 | 7/2010 | Kohl | |
| 2010/0219151 A1 | 9/2010 | Risheq | |
| 2010/0266351 A1 | 10/2010 | Vogel et al. | |
| 2010/0282682 A1 | 11/2010 | Eaton et al. | |
| 2011/0079551 A1 | 4/2011 | Olson et al. | |
| 2011/0079572 A1 | 4/2011 | Olson et al. | |
| 2011/0247975 A1 | 10/2011 | Rapparini | |
| 2011/0278216 A1 | 11/2011 | Hull et al. | |
| 2011/0303589 A1 | 12/2011 | Kuennen et al. | |
| 2011/0305801 A1 | 12/2011 | Beer | |
| 2012/0017766 A1 * | 1/2012 | Anson | B65D 47/12 99/290 |
| 2012/0055862 A1 | 3/2012 | Parekh et al. | |
| 2012/0061312 A1 | 3/2012 | Busick et al. | |
| 2012/0187036 A1 | 7/2012 | Risheq | |
| 2012/0193282 A1 | 8/2012 | Wolf et al. | |
| 2012/0214375 A1 | 8/2012 | Kitano et al. | |
| 2012/0255890 A1 | 10/2012 | Cumberland | |
| 2012/0292247 A1 | 11/2012 | Moon et al. | |
| 2012/0298614 A1 | 11/2012 | Nelson | |
| 2012/0325735 A1 | 12/2012 | Dicks et al. | |
| 2013/0037481 A1 | 2/2013 | Lalouch et al. | |
| 2013/0095212 A1 | 4/2013 | Beer | |
| 2013/0125748 A1 | 5/2013 | Taylor et al. | |
| 2013/0156897 A1 | 6/2013 | Goldstein | |
| 2013/0175228 A1 | 7/2013 | Utsch et al. | |
| 2013/0199989 A1 | 8/2013 | Carter et al. | |
| 2013/0233890 A1 | 9/2013 | Melzer | |
| 2013/0319927 A1 | 12/2013 | Lin | |
| 2014/0014566 A1 | 1/2014 | Mitchell | |
| 2015/0166364 A1 | 6/2015 | Wiegele | |
| 2016/0167980 A1 | 6/2016 | Dani et al. | |
| 2016/0376161 A1 | 12/2016 | Dani et al. | |
| 2016/0376162 A1 | 12/2016 | Dani et al. | |
| 2016/0376164 A1 | 12/2016 | Dani et al. | |
| 2016/0376165 A1 | 12/2016 | Dani et al. | |
| 2017/0001880 A1 | 1/2017 | Dani et al. | |

(56) References Cited

U.S. PATENT DOCUMENTS

FOREIGN PATENT DOCUMENTS

| EP | 0402661 | A1 | 12/1990 |
|---|---|---|---|
| EP | 0617951 | A2 | 10/1994 |
| GB | 2280596 | A | 2/1992 |
| GB | 2268680 | A | 1/1994 |
| JP | 657489 | U | 8/1994 |
| WO | 9835738 | A1 | 8/1998 |
| WO | PCT/US00/71468 | A1 | 11/2000 |
| WO | 2011145640 | A1 | 11/2011 |
| WO | 2012031853 | A1 | 3/2012 |
| WO | 2012150506 | A2 | 11/2012 |
| WO | 2013044079 | A1 | 3/2013 |
| WO | 2013088260 | A1 | 6/2013 |
| WO | 2014089207 | A1 | 6/2014 |
| WO | 2015073144 | A1 | 5/2015 |
| WO | 2015094741 | A1 | 6/2015 |
| WO | 2017055914 | A1 | 4/2017 |
| WO | 2017055915 | A1 | 4/2017 |
| WO | 2017055916 | A1 | 4/2017 |
| WO | 2017055918 | A1 | 4/2017 |

OTHER PUBLICATIONS

CamelBak: "CamelBak Relay Water Pitcher," published Jan. 22, 2014, p. 1, XP054977371, Retrieved from the Internet: URL: https://www.youtube.com/watch?v=01TdZCF8AqY [retrieved on May 18, 2017].
Supplementary European Search Report EP 14872175.6, dated Jun. 8, 2017.
Supplementary European Search Report EP 14871914.9, dated Jun. 13, 2017.
Supplementary European Search Report EP 14870910.8, dated Jun. 8, 2017.
Supplementary European Search Report EP 14871467.8, dated May 31, 2017.
Supplementary European Search Report EP 14871227.6, dated May 31, 2017.
NPL-1 ( "Activated Carbon Filter Bags", Filterek) Date: Jun. 4, 2012.
Oxford Dictionary Definition—coextensive, 2017, 1 page.
Oxford Dictionary Definition—immediately, 2017, 1 page.
Australian Office Action dated Feb. 22, 2018 in corresponding/related Australian Application No. 2014366927.
Australian Office Action dated Mar. 8, 2018 in corresponding/related Australian Application No. 2014366937.
Australian Office Action dated May 25, 2018 in corresponding/related Australian Application No. 2014366492.
Australian Office Action dated Jun. 22, 2018 in corresponding/related Australian Application No. 2014366926.
Australian Office Action dated Dec. 20, 2018 in corresponding/related Australian Application No. 2014366927.
Office Action dated Mar. 4, 2019 in corresponding/related Australian Application No. 2014366937.
Hutton, I.M. 2007, Handbook of Nonwoven Filter Media (1st ed.), pp. 96-99.
International Search Report and Written Opinion dated Feb. 6, 2017 in corresponding/related International Application No. PCT/IB2016/001472.
International Preliminary Report on Patentability dated Apr. 3, 2018 in corresponding/related International Application No. PCT/IB2016/001472.
International Search Report and Written Opinion dated Jan. 26, 2017 in corresponding/related International Application No. PCT/IB2016/001474.
International Preliminary Report on Patentability dated Apr. 3, 2018 in corresponding/related International Application No. PCT/IB2016/001474.
International Search Report and Written Opinion dated Jan. 27, 2017 in corresponding/related International Application No. PCT/IB2016/001479.
International Preliminary Report on Patentability dated Apr. 3, 2018 in corresponding/related International Application No. PCT/IB2016/001479.
International Search Report and Written Opinion dated Jan. 27, 2017 in corresponding/related International Application No. PCT/IB2016/001495.
International Preliminary Report on Patentability dated Apr. 3, 2018 in corresponding/related International Application No. PCT/IB2016/001495.

* cited by examiner

FLOW CONTROL DEVICE FOR FILTER AS YOU POUR SYSTEM

CROSS-REFERENCE TO RELATED APPLICATIONS

This application is the National Stage of International Application No. PCT/US2014/069037, filed Dec. 8, 2014, which claims the benefit under 35 U.S.C. 119(e) of U.S. Provisional Patent Application Ser. No. 61/940,101, filed Feb. 14, 2014. International Application No. PCT/US2014/069037, filed Dec. 8, 2014, is a continuation-in-part of U.S. patent application Ser. No. 14/132,134, filed Dec. 18, 2013. The disclosure of each of the above applications is incorporated by reference in its entirety.

BACKGROUND OF THE INVENTION

1. The Field of the Invention

The present invention is generally directed to filtered pour through container (e.g., pitcher) systems where filtering is achieved as the user pours water from the container. More specifically, the present invention is directed to flow control devices for use within such systems.

2. Description of Related Art

Drinking water, such as water from water purification facilities or well water, can contain certain additives or contaminants (referred to herein collectively as contaminants) such as chlorine, chloramines or various organic components. Chlorine is typically intentionally added to water to control microbes. For some, chlorinated water imparts an unpleasant taste or smell. Its presence may also raise health concerns to some consumers.

Existing pour-through pitcher systems, such as those available from BRITA, allow a user to fill a reservoir of the pitcher with water, which passes (under influence of gravity) through a filter, which removes contaminants from the water. The filtered water exits the filter into the main body of the pitcher, and may then be poured therefrom, providing filtered water for drinking.

One disadvantage of existing systems is that it may take several minutes for water introduced into the reservoir of such a system to be filtered, and ready for drinking. It would be beneficial to provide systems that might provide filtered water poured from a pitcher where the time required to filter may be reduced.

BRIEF SUMMARY

In an embodiment, the present invention is directed to a filter as you pour system comprising a flow control device for controlling flow of water through an outlet (e.g., spout) of the system. Such a system may include a container body defining an internal storage volume. A lid may be releasably attachable over the pitcher body, and a filter assembly may be attached to at least one of the lid or the pitcher body. The filter assembly may be disposed so as to be in a flow stream of the water, as the water is poured out of the container body through a system outlet, so that the stream of water exiting through the outlet is filtered as it is poured from the container body. A flow control device (e.g., a valve, grating, screen, a spout, etc.) may be disposed proximate the outlet to regulate and exit flow rate of water being poured through the outlet.

Another embodiment of the present invention is directed to a filter as you pour system comprising a flow control device for controlling flow of water through a pouring spout of the system. Such a system may include a pitcher body defining an internal storage volume. A lid may be releasably attachable over the pitcher body, and a filter assembly may be attached to the lid, the pitcher body, or both. The filter assembly may be disposed so as to be in a flow stream of the water, as the water is poured out of the container body through a pouring spout, so that the stream of water exiting through the spout is filtered as it is poured from the container body. A flow control device may be disposed proximate the pouring spout to regulate and exit flow rate of water being poured through the spout. The flow control device may comprise a spout that redirects flow of water from a direction that is coaxial with a longitudinal axis of the filter assembly to a direction that is generally perpendicular to the longitudinal axis of the filter assembly, or at least one of a valve or a grating (e.g., screen) that occludes a portion of the cross-sectional area of the outlet defined by the pouring spout.

Another embodiment of the present invention is directed to a filter as you pour system comprising a flow control device for controlling flow of water through a pouring spout of the system. Such a system may include a pitcher body defining an internal storage volume. A lid may be releasably attachable over the pitcher body, and a filter assembly may be attached to the lid, the pitcher body, or both. The filter assembly may be disposed so as to be in a flow stream of the water, as the water is poured out of the container body through the pouring spout, so that the stream of water exiting through the spout is filtered as it is poured from the container body. A flow control device may be disposed proximate a pouring spout to regulate and exit flow rate of water being poured through the spout. Filter media of the filter assembly may comprise an activated carbon textile material that presents a curved surface to the flow stream of water. The activated carbon textile material may aid in regulating the exit flow rate of water poured through the outlet of the pouring spout, such that the exit flow rate of water from the outlet is from about 0.3 gallons per minute (GPM) to about 2 GPM. Such flow rates are significantly greater than those provided by existing filtered pitcher systems.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

I. Definitions

Figure 1:
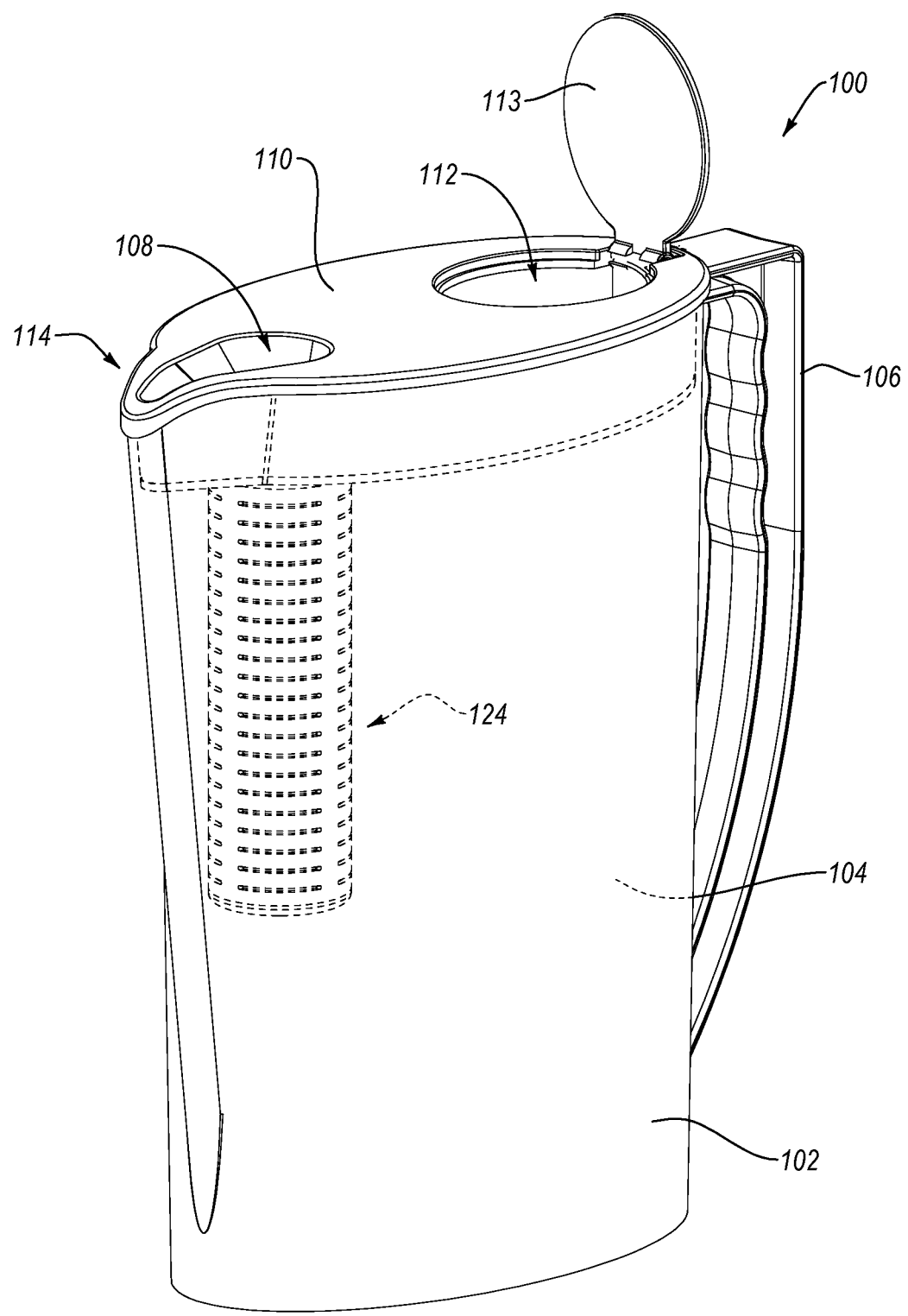
FIG. 1 is a perspective view of an exemplary filter as you pour pitcher system according to an embodiment of the present invention.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Various aspects of the present devices, systems, and methods may be illustrated with reference to one or more exemplary embodiments. As used herein, the term "exemplary" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentages ("wt %'s") are in wt % (based on 100 weight % active) of the particular material present in the referenced composition, any remaining percentage typically being water or an aqueous carrier sufficient to account for 100% of the composition, unless otherwise noted. For very low weight percentages, the term "ppm" corresponding to parts per million on a weight/weight basis may be used, noting that 1.0 wt % corresponds to 10,000 ppm.

II. Introduction

The present disclosure is directed to gravity fed water filtration container systems which may advantageously provide for faster flow rates of the water through the filter assembly of the system, allowing unfiltered water to be filtered as it is poured from the container of the system (i.e., a filter as you pour system).

Such a system may include a container body defining an internal storage volume, and system outlet through which water within the container body may be poured and simultaneously filtered. The system may further include a lid that may be releasably attachable over the container body (e.g., a pitcher body), and a filter assembly attachable to at least one of the lid or the container body. The filter assembly may be disposed so as to be in a flow stream of the water, as the water is poured out of the container body through an outlet of the system, so that the stream of water exiting through the outlet is simultaneously filtered as it is poured from the container body. The system may further include a flow control device (e.g., a valve, grating, screen, etc.) disposed proximate (e.g., in or over) the outlet to regulate an exit flow rate of water being poured through the outlet.

III. Exemplary Systems

FIG. 1 show an exemplary system 100, which may operate as a filter as you pour system. As illustrated, system 100 may include a container body 102 that defines an internal storage volume 104 for holding water (e.g., unfiltered water). As shown, container body 102 may include a handle 106 to aid in pouring water disposed within storage volume 104 out an outlet 108 of system 100. System 100 may further include a lid 110 that may be disposed over container body 102. Lid 110 may be releasably attachable relative to container body 102, e.g., it may include any suitable complementary locking structures disposed in lid 110 and/or container body 102 so as to allow lid 110 to be releasably attached or retained by container body. Friction fits between the two components, or any of various lock and key locking structures may be employed, e.g., so as to ensure that lid 110 does not inadvertently fall off of container body 102. Additional details of exemplary locking mechanisms are disclosed in U.S. patent application Ser. No. 15/038,982, filed the same day as the present application and herein incorporated by reference.

Lid 110 may include an inlet 112, through which unfiltered water may be introduced into the container body 102. Inlet 112 may be selectively covered by inlet cover 113 (e.g., hingedly connected to lid 110). In an embodiment, outlet 108 may be defined within lid 110. As illustrated in FIG. 1, container body 102 may be configured as a pitcher, e.g., including a spout 114, adjacent outlet 108. Spout 114, as illustrated, may be defined by structures in both container body 102 and lid 110. For example, container body 102 is shown as including a portion which tapers or narrows towards spout 114. Similarly, lid 110 is shown as including a corresponding cross-sectional shape, also being tapered at the portion corresponding to spout 114, so that lid 110 fits into the open top of container body 102. In addition, lid 110 is shown as including flared portions 116 adjacent outlet 108, providing a surface which slopes downward from a top of lid 110 to outlet 108. As a result, flared portion 116 defines a larger opening adjacent the top of lid 110, which slopes downward, much like a funnel, towards outlet 108.

In addition, in the illustrated embodiment, outlet 108 is shown as being disposed at the proximal end of spout 114, so that water exiting outlet 108 will flow along the tapered or narrowing spout portion 118 of lid 110, until it reaches the extreme end of tapered spout portion 118, and exits the system 100 (e.g., into a glass, other container, etc.).

Figure 2A:
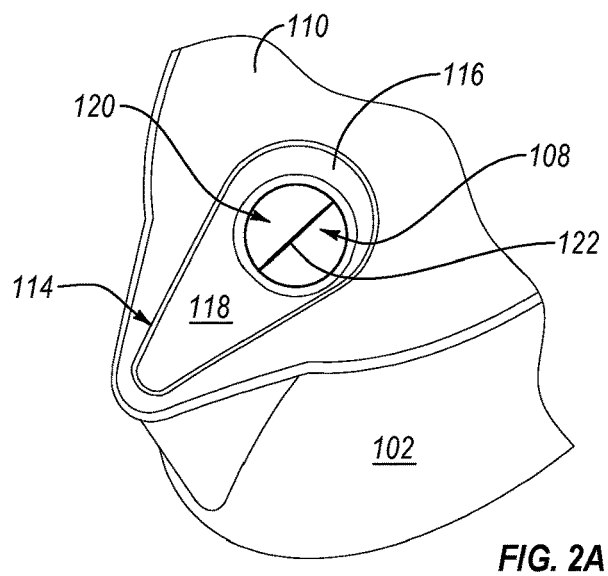
FIG. 2A is a close up view showing an exemplary flow control device comprising a valve in the outlet of a system such as that of FIG. 1.
Figure 2B:
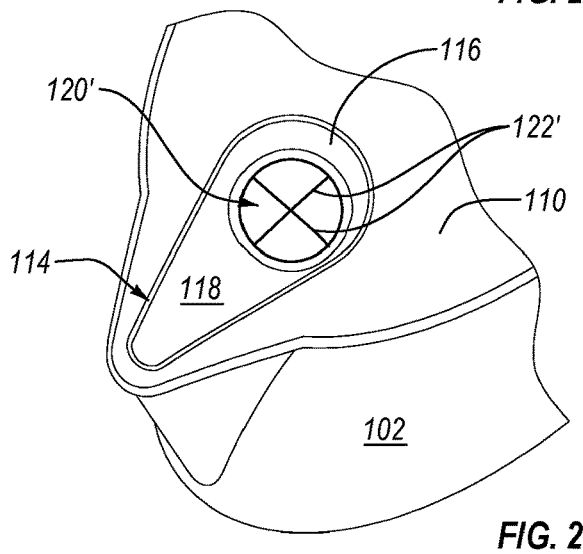
FIG. 2B is a close up view similar to FIG. 2A, showing another slit valve configuration.
Figure 2C:
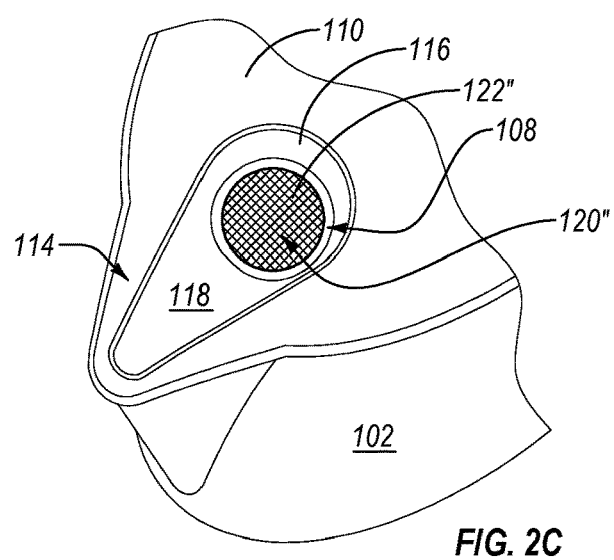
FIG. 2C is a close up view showing another exemplary flow control device, comprising a grating in the outlet of a system such as that of FIG. 1.

As seen in FIGS. 2A-2C, a valve 120 (e.g., a slit valve as in FIGS. 2A-2B), a grating or screen 120' (e.g., seen in FIG. 2C), or other flow control device may be disposed proximate outlet 108 (e.g., within outlet 108). Such a flow control device may advantageously serve to regulate an exit flow rate of water poured through outlet 108. For example, the flow control device may aid in ensuring that the exit flow rate of water from the system 100 is more consistent than might occur without such a flow control device. In addition, the flow control device may aid in ensuring that the flow rate is within a desired range of exit flow rates (e.g., from about 0.5 gallons per minute to about 0.8 gallons per minute). Because the system includes a filter assembly, and in some embodiments, water passing through the filter assembly may in some circumstances result in varying flow rates as the stream of water exits the filter assembly, the inclusion of such a flow control device may serve to more homogenously regulate the exit flow rate from the system as a whole, so as to be more consistent.

FIG. 2A illustrates a slit valve 120 in outlet 108. Such a valve may comprise an elastomeric material (e.g., a thermoplastic elastomer that may be molded as a second shot when injection molding lid 110, overmolded thereover, etc.) that includes one or more slits disposed therein. In the illustrated embodiment, the slit 122 is shown as running generally over the diameter of outlet 108, aligned with tapered spout portion 118 and spout 114. As system 100 is tipped when it is desired to pour water from the system, water pressure builds up on the inside of slit valve 120, forcing slit 122 to open, allowing water to be poured therethrough under the weight of the water pressing against the inside surface of slit 122. When the system is untipped, back towards a standard vertical orientation (e.g., as when setting container body 102 on a horizontal table or other horizontal surface), slit 122 of valve 120 again closes.

In another embodiment, more than one slit may be provided, and/or the slit may be oriented differently within outlet 108. For example, rather than including a slit that is aligned (e.g., coaxial with a longitudinal axis of tapered spout portion 118), the slit could be oriented so as to be perpendicular to the longitudinal axis of the tapered spout portion 118, or otherwise transverse relative to such axis. In another embodiment, two slits may be provided so as to form a + in the outlet, with one slit being coaxial relative to a longitudinal axis of portion 118, and the other slit being perpendicular to the longitudinal axis of portion 118. Such a + shaped slit valve 120' is shown in FIG. 2B, including perpendicular slits 122'.

FIG. 2C shows a flow control device configured as a screen or grating 120" disposed within outlet 108. The screen or grating 120" may be defined by a bars or cross-bars structure disposed proximate the outlet (e.g., within the outlet) that occludes a portion of the cross-sectional area of the outlet (e.g., forming a lattice). In an embodiment, as shown in FIG. 2C, a plurality of cross-bars 122" may be disposed with a series of bars running parallel to one another, and another series of bars running perpendicular to the first series of bars, so as to form a lattice or screen structure, as shown. Of course, in another embodiment, all of the bars may run in the same direction, so as to not include any cross-bar oriented members. The term grating as employed herein may broadly refer to any such occluding structure including a plurality of bars, whether crossed or not.

In an embodiment, such a grating may occlude about 10% to about 50% of the cross-sectional area of outlet 108. In another embodiment, the grating may occlude about 15% to about 30% of the cross-sectional area of the outlet. Such a grating disposed within outlet 108 may serve to regulate an exit flow rate of water through the outlet, providing similar advantages as described above relative to a slit valve flow control device. It will be appreciated that other flow control devices may similarly be provided proximate the outlet 108, so as to regulate an exit flow rate of water from the system. Such devices may include other types of valves, as well as other devices which may serve to similarly regulate the exit flow rate.

System 100 further includes a filter assembly 124 that is attachable to lid 110, container body 102, or both lid 110 and container body 102. Filter assembly 124 is disposed within system 100 so as to be in a flow stream of the water as the water is poured from container body 102, through outlet 108. As a result, the stream of water exiting through outlet 108 is simultaneously filtered as it is poured from container body 102.

Figure 3:
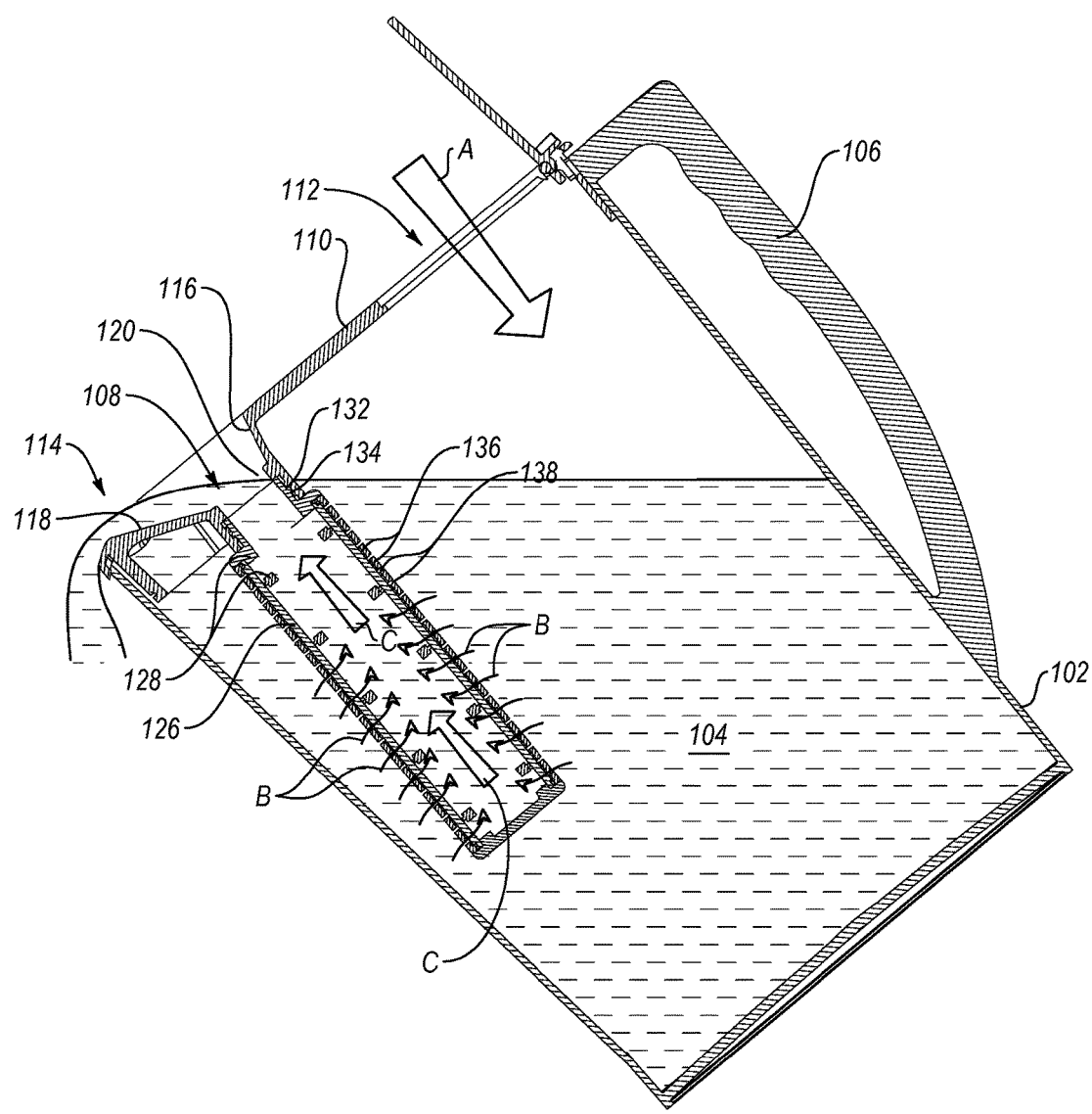
FIG. 3 is a schematic cross-sectional view through the system of FIG. 1 showing a flow path of water as it is introduced into the container of the system, and flows into the filter housing, through the filter housing, and out the outlet of the system.

Filter assembly 124 may be releasably attachable to lid 110 through a thread and groove structural arrangement, e.g., so that assembly 124 may screw into lid 110, around or within outlet 108. In the illustrated embodiment, as perhaps best seen in cross-sectional view of FIG. 3, grooves 132 may be formed into the inside surface of outlet 108, with corresponding threads 134 formed into an exterior surface of the top end of filter assembly 124. Alternatively, the threads may be formed on the inside of outlet 108, and corresponding grooves formed into the exterior surface at the top of assembly 124. In another embodiment, the threads or grooves of outlet 108 could be disposed on an exterior surface of outlet 108, and the corresponding threads or grooves of filter assembly 124 could be disposed on an interior surface of the top end of the filter assembly, so that the filter assembly is releasably attachable over and about (e.g., surrounding) the outlet 108. The illustrated embodiment of FIG. 3 shows releasable attachment within outlet 108.

Filter assembly 124 is shown as being generally cylindrical, although it will be appreciated that other configurations may also be employed. In any case, the filter assembly may be configured to filter unfiltered water within container body 102 as it is poured therefrom, while at the same time providing a flow rate of water through outlet 108 that is at least about 0.3 gallons per minute (GPM). In an embodiment, the filter-as-you-pour system may be configured to provide a minimum flow rate of 0.5 GPM. In another embodiment, the filter assembly is advantageously configured to provide and allow for exit flow rates from about 0.3 GPM to about 2 GPM, from about 0.3 GPM to about 1 GPM, or from about 0.5 GPM to about 0.8 GPM. Such flow rates are typically not possible with filter assemblies including granulated, particulate filter media typically employed in gravity fed water filtration systems that include a reservoir into which unfiltered water is introduced, which water then trickles through the filter assembly and into the container body (e.g., pitcher), where it can then be poured therefrom. For example, filter assemblies based on such filter media typically require 3 to 8 minutes to filter 1 liter of water (e.g., corresponding to a flow rate of 0.03 GPM to 0.09 GPM).

The filter assemblies employed in the present invention may advantageously provide for much faster filtration flow rates, such as those above. In an embodiment, the filter media of the filter assembly comprises an activated carbon textile material (i.e., such a textile material is fibrous), which textile material is arranged within the filter assembly so as to present a curved surface to the flow stream of water. Such textile materials disposed so as to present a curved surface to the flow stream of water have surprisingly been found to provide and allow for significantly faster flow rates as compared to the 3 to 8 minutes to filter 1 liter. For example, exit flow rates may be from about 0.3 GPM to about 2 GPM or 0.3 GPM to about 1 GPM.

The textile material may be formed from structural elements selected from the group consisting of fibers, yarns, filaments, flexible porous composites, combinations thereof, etc., which may be woven, non-woven, braided, or otherwise joined into a textile material. Such textile materials may typically be comprised of relatively high aspect ratio structural elements whose length is orders of magnitude (e.g., 1-5 orders of magnitude) larger than the diameter.

Such textile materials also may have varying degrees of structural integrity based on the amount, size, and distribution of the structural elements. For example some textile structures may have the structural elements loosely held generally parallel to each other while in other embodiments the structural elements may be twisted around a longitudinal axis or they may be interlaced orthogonally relative to each other or they may be randomly oriented relative to each other. The physical dimensions and orientation of the structural elements of the textile material also create a depth to thickness ratio for the resulting textile material, along with pores of various sizes.

For best use in water filtration applications these textile materials preferably may have an optimal combination of thickness and pore size distribution to not only allow water to flow at the desired flow rate, but also contain enough mass of material to enable desired levels of contaminant reduction, while having enough physical integrity to prevent the structural elements the textile material is made of from being dislodged by the water penetrating through it.

By way of non-limiting example, a textile material employed as filter media may have properties as shown in Table 1 below.

TABLE 1

| Property | Specification |
| --- | --- |
| Basis Weight | 25-200 g/m$^2$ |
| Thickness | 0.5-5.0 mm |
| Iodine Number | 500-3000 mg/g |
| Pore size distribution (avg.) | 5-1000 μm |
| Fiber diameter (avg.) | 1-50 μm |

Exemplary textile materials may have a thickness from about 0.5 mm to about 2 mm (e.g., about 0.75 mm to about 1 mm). The fibers of the textile material may have any suitable diameter, e.g., from about 0.1 μm to about 50 μm, or from about 0.1 to about 20 μm. It is believed that the fibrous characteristics of the textile material from which the filter media is formed may be at least in part responsible for the relatively high flow rates. Such characteristics are believed to exhibit higher ratios of surface area to volume than possible with filter media foam substrates, providing superior filtration effectiveness characteristics than possible with a single pass through a typical foam filter media material. For example, the efficiency available with a foam filter media may be only about ⅓ that provided by granulated activated carbon filter media (e.g., 99% chlorine removal), or the described textile media (e.g., at least 80%, at least 85%, at least 90%, at least 95%, or at least 99% chlorine removal in a single pass). Such textile materials also provide lower flow resistance than available when using granulated activated carbon filter media, making possible the desired relatively high flow rates.

Stated another way, the filter-as-you-pour systems of the present invention employ a textile filter media material arranged so as to present a curved surface to inflowing water to be filtered. The configurations allow for relatively compact filter assemblies capable of providing performance equivalent or similar to larger (e.g., greater surface area of filter media) or multi-stage systems. The filter-as-you-pour system places textile filter media material in the path of water flowing out from the container body under gravity-flow conditions. Under such conditions, with a known porous filter material constant bulk density, Darcy's law applies:

$$k = \frac{QL\mu}{\rho g A \Delta P}$$

| Symbol | Variable | Typical Units Metric (English) | Typical Operating Range |
| --- | --- | --- | --- |
| k | Intrinsic Permeability | cm/s (ft/s) | 1.2 × 10$^{-7}$-3.7 × 10$^{-4}$ (4 × 10$^{-9}$-1.2 × 10$^{-5}$) |
| Q | Flow Rate | L/min (gal/min) | 0.75-7.5 (0.2-2.0) |
| L | Path Length | cm (in) | 0.1-0.5 (0.04-0.2) |
| μ | Dynamic Viscosity | g/cm-s (lbf/ft-s) | 0.9-1.4 (0.06-0. |
| ρ | Fluid Density | g/cm$^3$ (lb/ft$^3$) | 1.00 (62.4) |
| G | Gravity Acceleration | cm/s$^2$ (ft/s$^2$) | 980.665 (32.174) |
| A | Surface Area | cm2 (ft$^2$) | 50-650 (0.05-0.60) |
| ΔP | Pressure Differential | cm H$_2$O (lb/in$^2$) | 5-15 (0.07-0.22) |

Figure 8:
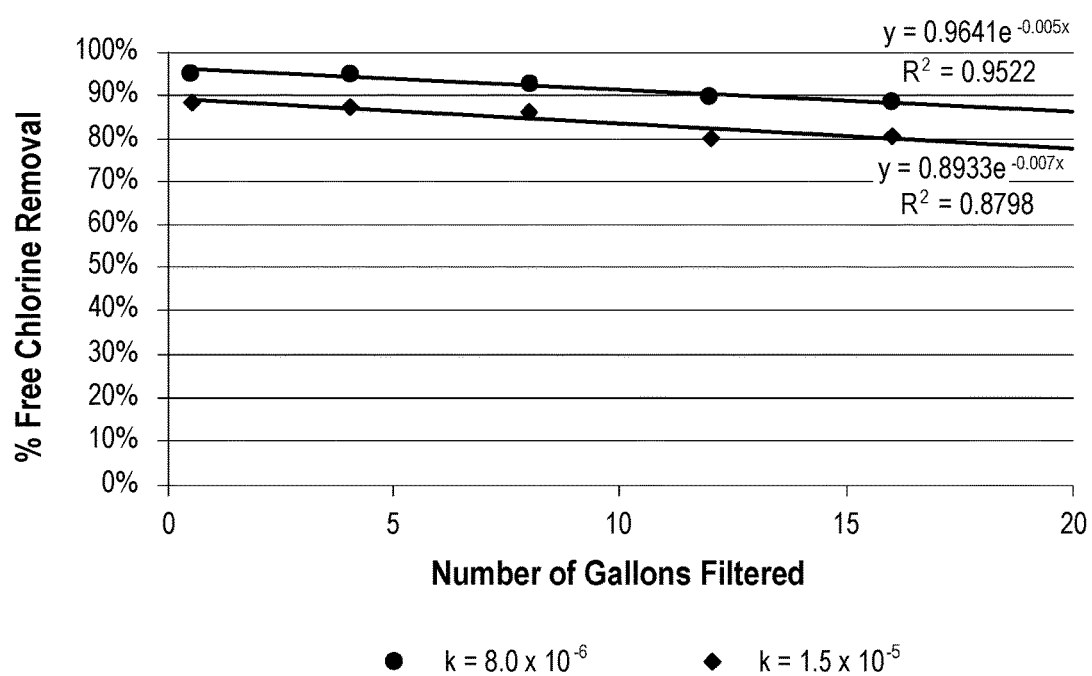
FIG. 8 is a graph illustrating how free chlorine removal may decrease with increasing throughput.

For a given filter material density and associated permeability, the removal efficiency for a given water contaminant (e.g., chlorine) can be related directly to the mass load of that constituent over time. For a constant influent concentration (e.g., the unfiltered water all includes the same chlorine concentration), removal efficiency can be related to total flow throughput. For a first-order reaction, such as that characteristic of free chlorine degradation or adsorption on activated carbon, this follows an exponential curve. As permeability increases, contaminant removal decreases. The filter-as-you-pour configuration and textile filter media material described has the advantage of providing higher contaminant removal efficiency at higher permeability than alternative methods. Because of these advantages, this allows relatively smaller filtration assemblies, and/or better removal efficiencies. FIG. 8 illustrates exemplary contaminant removal profiles for two different permeability values over a portion of the life of a filter assembly.

Such filter assemblies may have a life of at least about 20 gallons, at least about 30 gallons, at least about 40 gallons, from about 40 to about 80 gallons, etc. At the end of its life the filter assembly may still achieve chlorine removal of at least 60%, at least 70%, or at least 75%. The filter assemblies may meet applicable NSF/AISI 42 standards. As shown in FIG. 8, the contaminant removal efficiency may be relatively consistent over the life of the filter assembly (e.g., within ±30%, within ±25%, within ±20%, within ±10%, or within ±5% of a lifetime average removal efficiency.

Figure 4A:
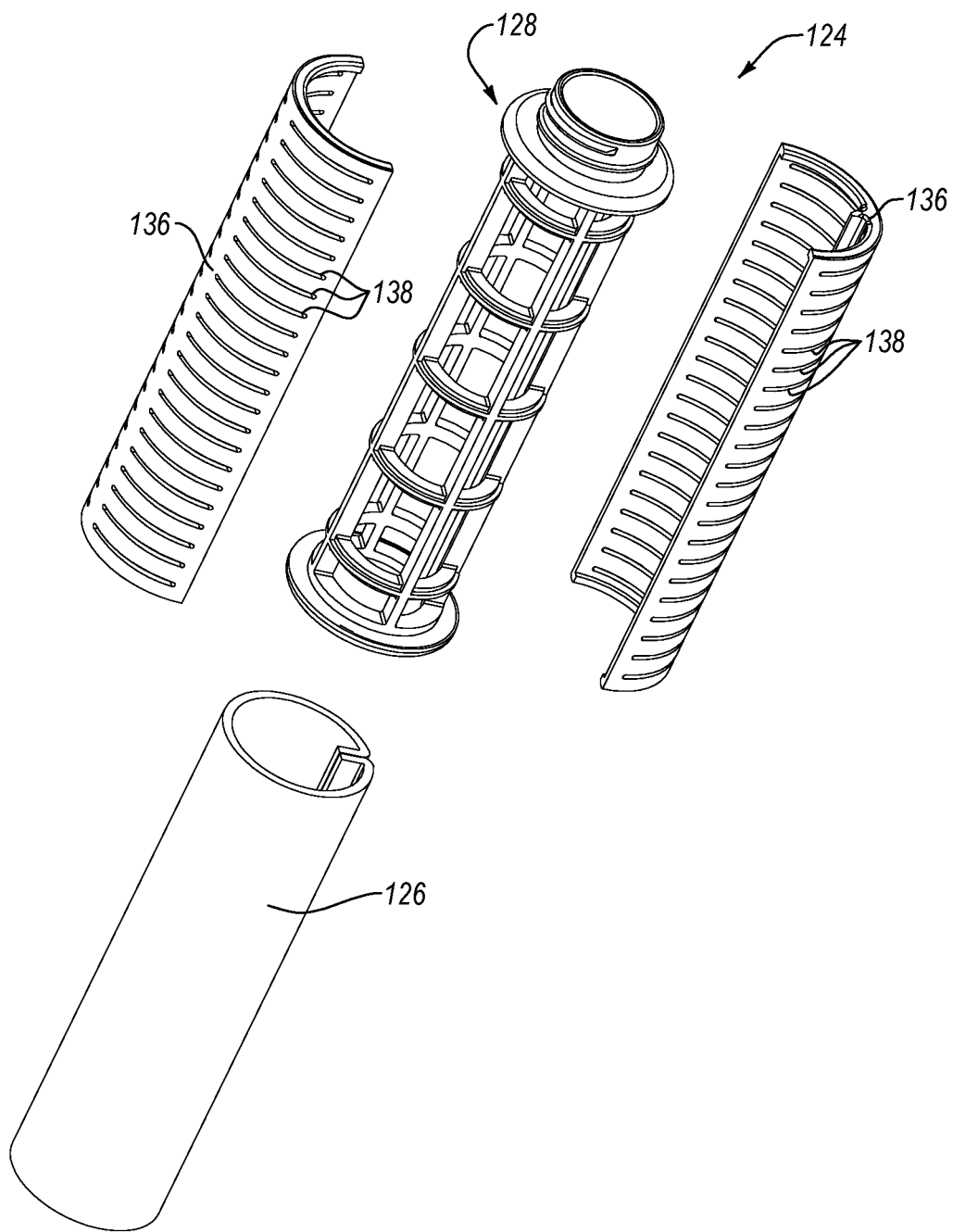
FIG. 4A is an exploded perspective view of an exemplary filter assembly such as that included in the system of FIG. 1.

FIG. 4A illustrates an exploded view of filter assembly 124. The textile filter material 126 may comprise one or more layers that are wrapped around a core frame member 128 of the filter assembly 124, so that the flexible, fibrous textile material presents a curved surface to water entering the filter assembly 124. Assembly 124 is shown as being mounted generally vertically within storage volume 104 (e.g., attached to lid 110). A casing or shell 136 may be disposed about core frame member 128, sandwiching textile material 126 between shell 136 and core frame member 128. As shown, shell 136 may include slots 138 disposed therein, so as to allow water to be filtered by assembly 124 to enter. With respect to structure 136 and similar structures, the terms casing and shell may be interchangeably employed.

FIG. 3 illustrates an exemplary flow path along which the water may pass as it moves through system 100, including assembly 124. For example, water may be introduced into container body 102 through inlet 112 in lid 110, as depicted by arrow A. As shown, advantageously, no filter may be disposed between inlet 112 and storage volume 104, so that unfiltered water may be quickly introduced into container body 102, without any delay associated with a filter disposed between inlet 112 and storage volume 104. Rather than filtering upon entering container body 102, at least some embodiments of the present invention provide for filtering of the water only as it exits through outlet 108. Of course, some embodiments may provide filtering upon entrance and exit, if desired (e.g., where the inlet and the outlet are one and the same).

When tipping pitcher or other container body 102 (e.g., as depicted in FIG. 3), the water may flow along a radial flow path B, through one or more layers of textile filter media 126, which advantageously is disposed so as to present a curved, rather than perpendicular or planar surface to the stream of water. By positioning textile filter media 126 so that at least a portion thereof presents a curved, rather than planar surface, the inventors have surprisingly found that flow rates through the filter media are significantly increased. Once the water passes through layer(s) 126, the filtered water may then flow axially, as represented by arrows C, up towards outlet 108. The filtered water may pass through flow control device 120 (e.g., a slit valve, grating, etc.), and over spout portion 118 of lid 110. Another example of a flow control device (spout 314) is shown and described in conjunction with FIGS. 7A-7C.

In an embodiment, characteristics of textile filter media material 126 may also be adjusted to alter the flow characteristics of the stream of water exiting the system, e.g., in combination with the flow control device disposed proximate the outlet 108. For example, in an embodiment, the filter media 126 may comprise a single layer of the activated carbon textile material. In another embodiment, a second layer may be provided, so that the filter media comprises two layers of activated carbon textile material (e.g., two layers, each about 0.75 mm to about 1 mm in thickness). Similar results may be achieved by increasing the thickness of a single textile material layer (e.g., about 1.5 mm to 2 mm rather than a 0.75 mm to 1 mm thick single layer). Providing two layers of textile filter media material 126 (or a thicker single layer) may reduce the flow rate of water through the system as compared to a single layer of a given thickness.

Use of two layers may also increase the filtration effectiveness characteristics (e.g., a higher fraction of removed chlorine), or increase life (e.g., gallons filtered before recommended filter replacement). For example, use of two layers may flatten the curve resulting from a plot of chlorine removal versus gallons filtered (see FIG. 8), providing increased consistency over the life of the filter. In addition, the second layer may be differently configured relative to the first layer, so as to remove different contaminants. For example, a second layer may comprise an ion exchange resin (IER) in fibrous, textile (e.g., felt) form, so as to be disposed within filter assembly 124 in a similar manner as the activated carbon textile material 126, but capable of removing heavy metal contaminants (e.g., copper, cadmium, mercury, lead, etc.).

The activated carbon textile material 126 is fibrous, e.g., so that fibers, filaments, or other structural elements of the material may be matted, woven, braided, or otherwise joined together. Such a fibrous material exhibits very high porosity characteristics, allowing and providing for the relatively high flow rates of water therethrough, as described herein. Such porosity and associated flowrate characteristics are not possible with traditionally employed filter media, such as monolithic activated carbon block, a bed of activated carbon granules or particles. Although filtering foam filter media may offer gravity fed flow rates therethrough that are higher than those possible with granulated or monolithic activated carbon, such foam filter systems are not particularly efficient in removing chlorine or other contaminants For example, more foam material is required to achieve a desired target removal efficiency. For example, foam media may remove only about ⅓ as much chlorine in a single pass under typical use conditions. As a result, products relying on filtration using a foam filter media pass the water through the foam filter media both upon entry and exit from the container in order to achieve an acceptable level of contaminant removal efficacy. Employing the fibrous activated carbon textile material as described herein advantageously is capable of achieving contaminant removal efficacy that is comparable to that achieved by products employing monolithic or granulated activated carbon filter media (e.g., as much as about 3 times greater than that provided by foam, for example, at least 80% removal, at least 85% removal, at least 90% removal, at least 95% removal, or at least 99% removal), but at flow rates that are significantly higher (e.g., at least about 0.3 GPM) than granulated activated carbon, which makes practical implementation of a filter-as-you-pour container system possible.

Described another way, the filter assembly 124 is configured so that when water passes from storage volume 104 towards outlet 108, the inlet thereto (e.g., slots 138) is disposed about the perimeter of filter assembly 124, while the outlet is aligned with the longitudinal axis of filter assembly 124. Because slots 138 provide a relatively high surface area along which water may enter and penetrate through textile material 126, a high flow rate of water through assembly 124 is possible. The filtered water (having passed through filter media 126) is collected in the central hollow section of core frame 128, and then exits axially towards outlet 108.

Figure 4B:
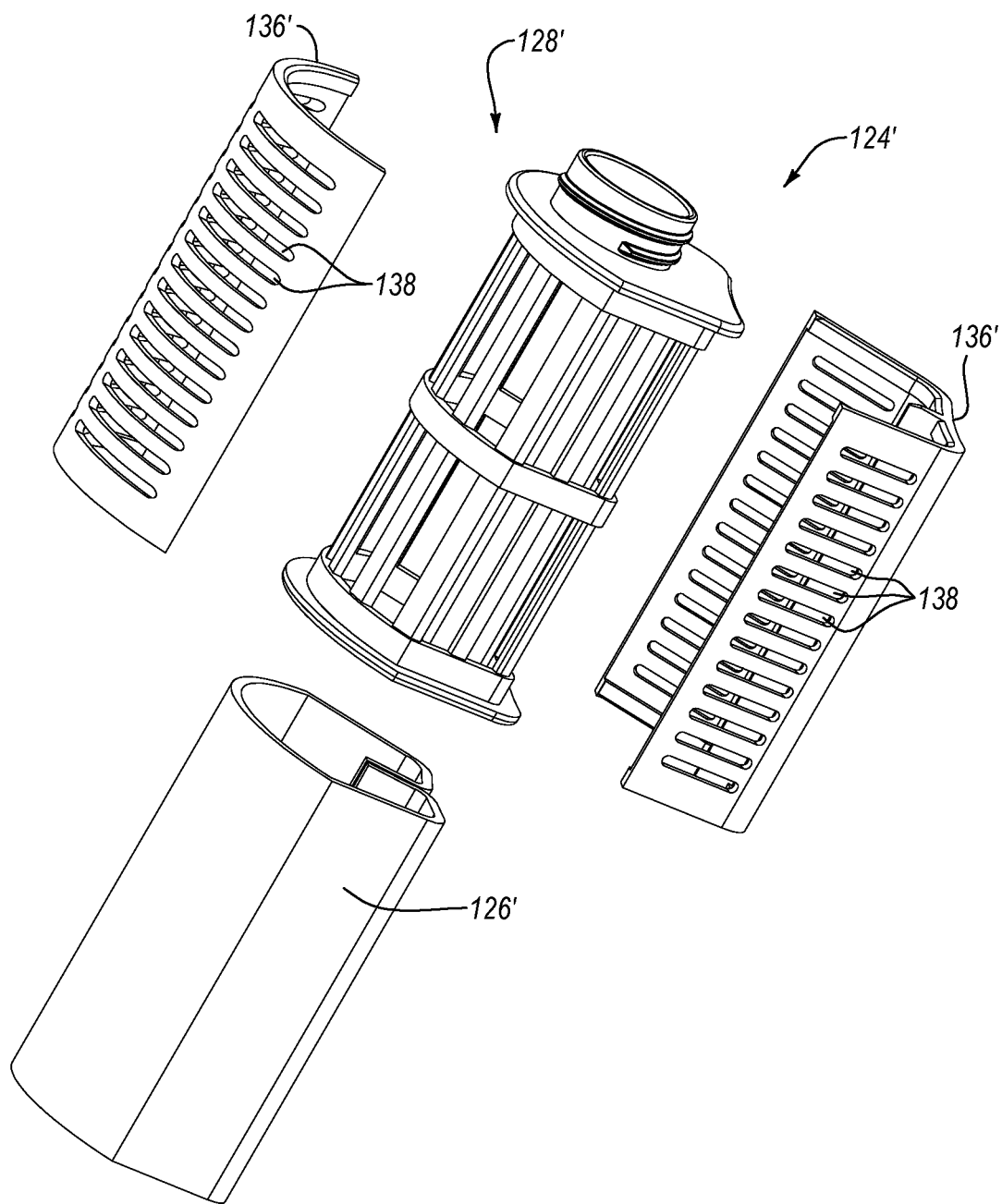
FIG. 4B is an exploded perspective view of another exemplary filter assembly suitable for use with the present invention.
Figure 5:
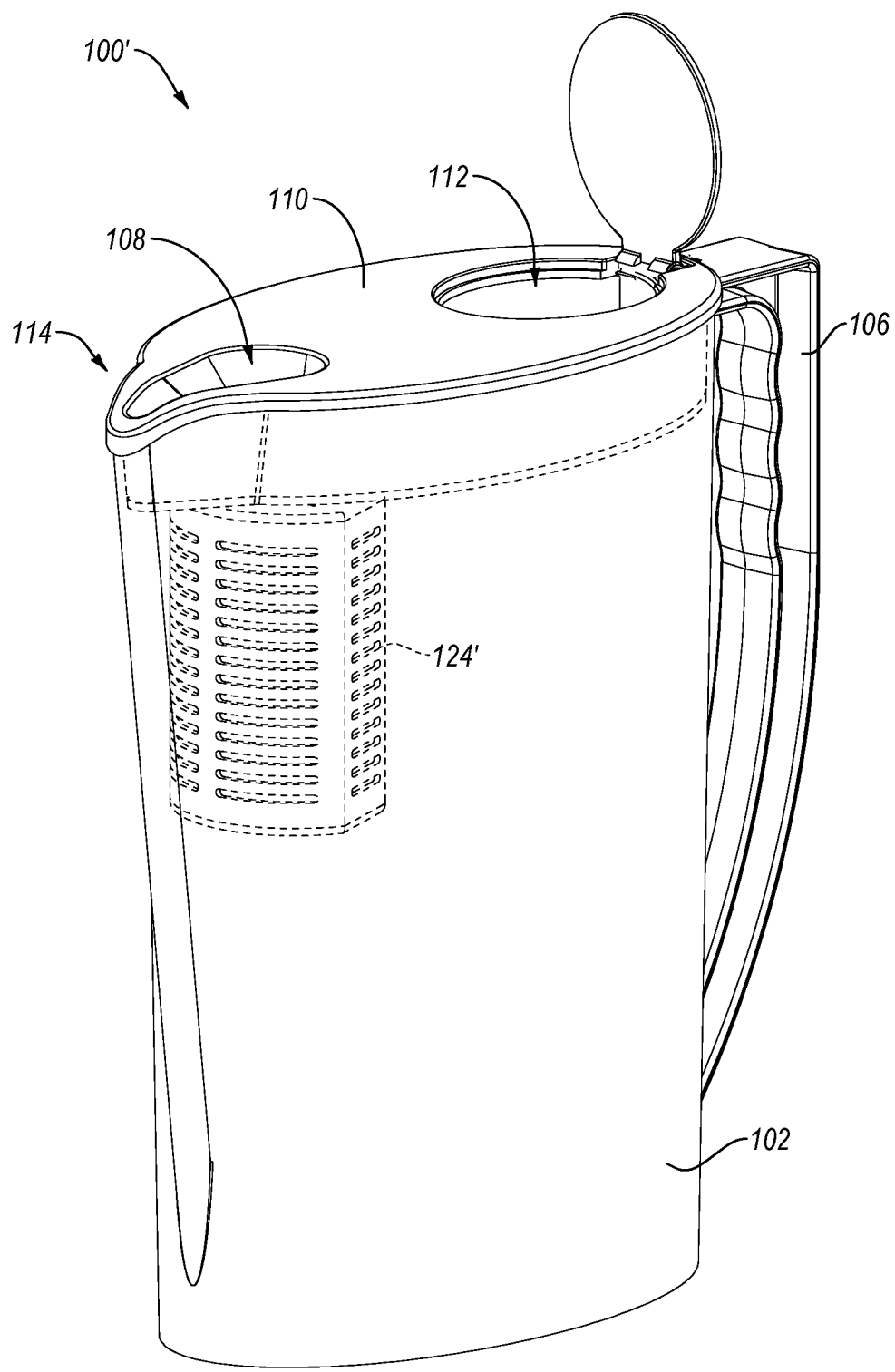
FIG. 5 is a perspective view of another exemplary pitcher system similar to that of FIG. 1, but employing the filter assembly of FIG. 4B.

FIG. 4B illustrates another filter assembly configuration 124', where the front face of filter assembly 124' is curved, and FIG. 5 shows an exemplary system 100' including filter assembly 124'. System 100' may be otherwise similar to system 100 of FIG. 1 including a core frame 128' about which textile filter media material 126' is wrapped, with casing or shell portions 136' disposed thereover. It will be readily apparent that various filter assembly configurations may be employed. Additional details of exemplary filter assemblies, including filter media and filter housings are disclosed in U.S. patent application Ser. No. 14/569,397; U.S. patent application Ser. No. 15/038,996; and U.S. patent application Ser. No. 15/038,998, each filed the same day as the present application and herein incorporated by reference in its entirety.

Figure 6A:
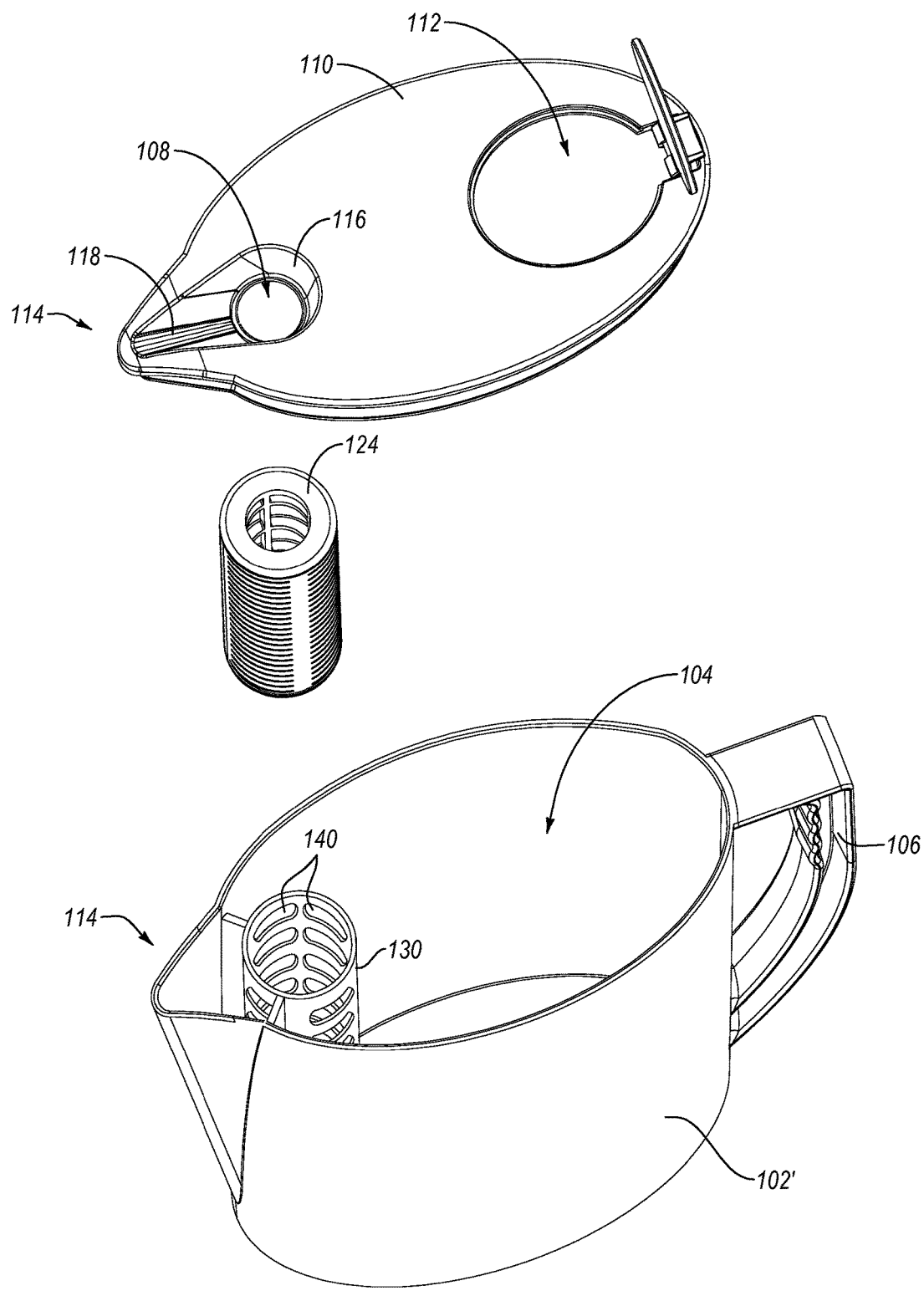
FIGS. 6A-6B are exploded views showing yet another exemplary pitcher system, where the filter assembly is attached to the pitcher body, rather than the lid.
Figure 6B:
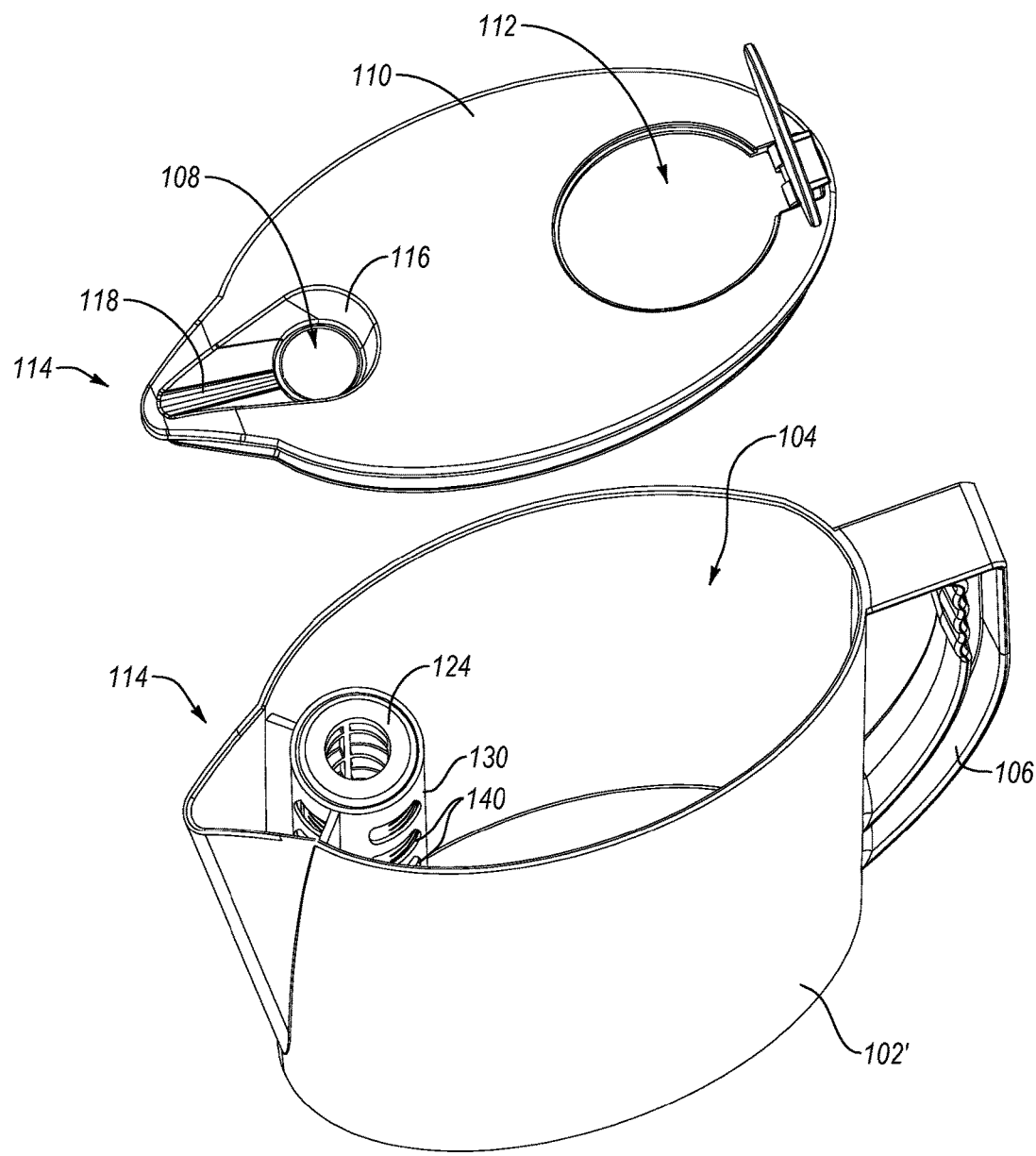
Figure 6C:
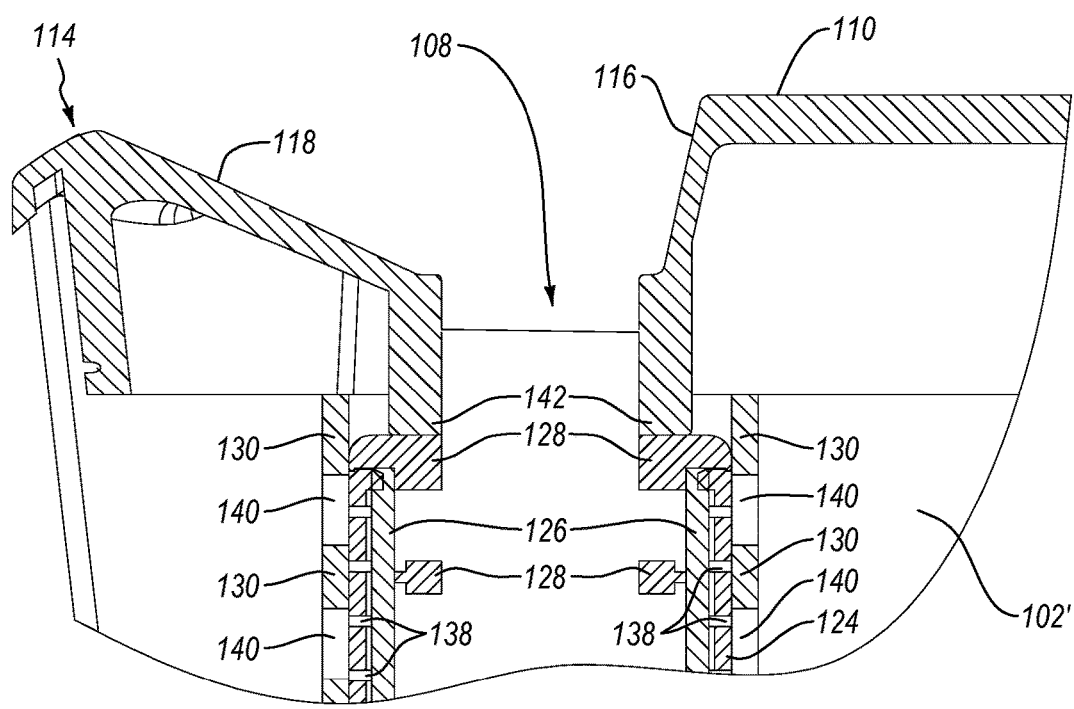
FIG. 6C is a cross-sectional view of the system of FIGS. 6A-6B, showing the filter assembly captured within and between the receptacle of the pitcher body and the lid placed over the pitcher body.

The filter assemblies 124 and 124' of FIGS. 1 and 5 are shown as attached to lid 110 (e.g., through any suitable releasable attachment mechanism, such as the illustrated threaded connection, a friction fit, etc.). In another embodiment, the filter assembly may be releasably attached or disposed within structure of the container body of the system. FIGS. 6A-6C illustrate such an exemplary configuration, where container body 102' may include a receptacle 130 into which the filter assembly (e.g., assembly 124) may be received. Receptable 130 of container body 102' may include slots 140 disposed therein to allow water within storage volume 104 to pass through the wall of receptacle 130, into slots 138 of filter assembly 124. Water may flow through filter assembly 124 in a similar manner as described in conjunction with FIG. 3.

As seen in FIGS. 6B and 6C, filter assembly may drop down into receptacle 130, and be retained therein once lid 110 is placed over the open top of container body 102'. Additional embodiments are illustrated and described below in conjunction with FIGS. 7A-7C. Outlet 108 through lid 110 may be axially aligned with the longitudinal axis of generally vertical cylindrical filter assembly 124, so that water within the central core of assembly 124 flows axially upward, towards outlet 108. A seal or other barrier may be provided between the top of receptacle 130 and the bottom of outlet 108 to minimize any risk of bypass, by which water could exit through outlet 108 without first passing through filter assembly 124. FIG. 6C illustrates such a feature, as a sealing extension 142 which extends downwardly from outlet 108, into or about the top of receptacle 130. Such an extension may press against the top of assembly 124 and/or receptacle 130, so as to also minimize or prevent axial translation of assembly 124 within receptacle 130, which may otherwise occur where assembly 124 is merely trapped rather than directly attached to the lid or container body. Of course, in an embodiment, assembly 124 could also screw into or otherwise releasably attach to lid 110. Similarly, assembly 124 could screw into or otherwise releasably attach to receptacle 130 (e.g., the bottom of receptacle 130), if desired.

Figure 7A:
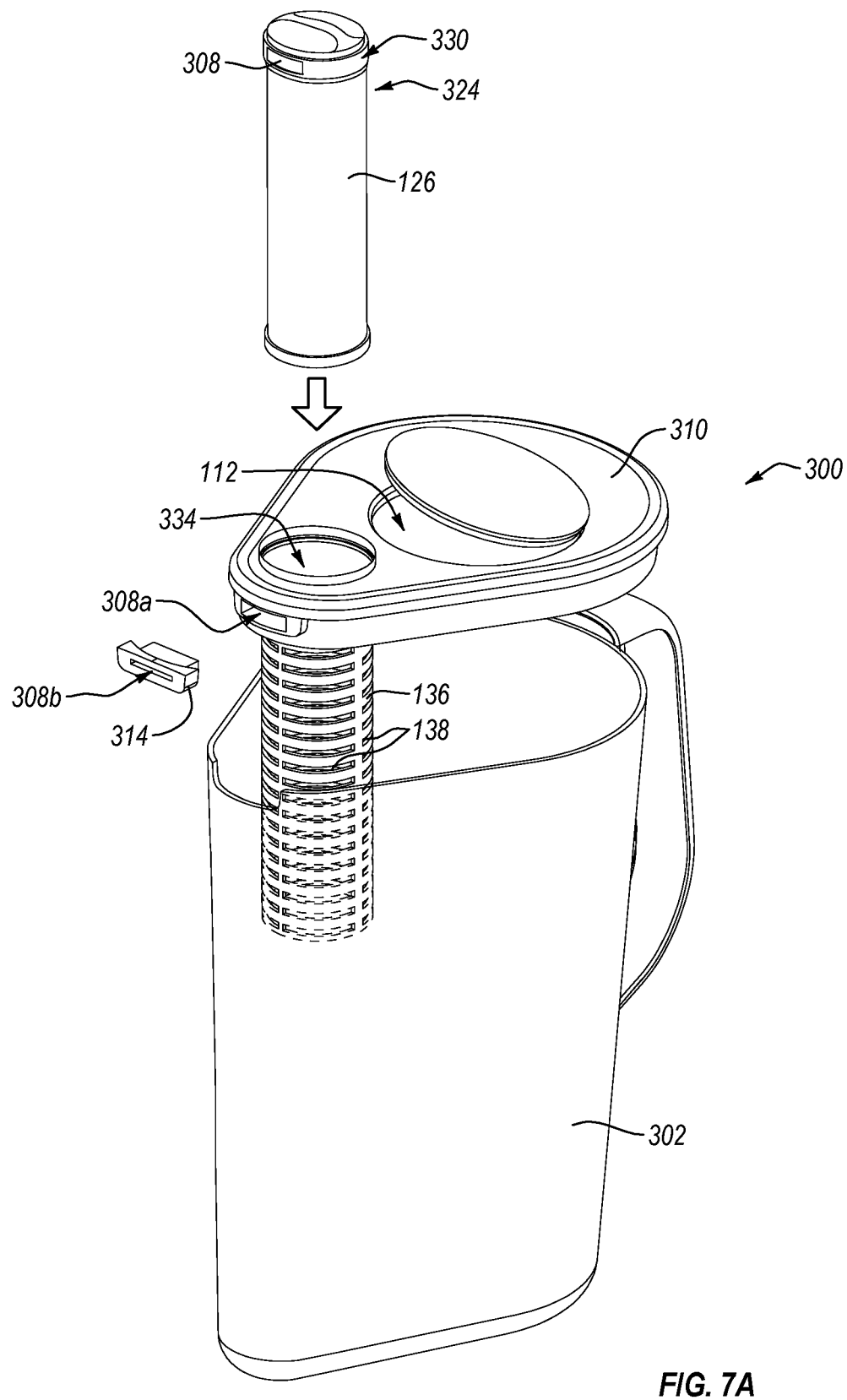
FIG. 7A is an exploded perspective view illustrating another exemplary embodiment of a filter-as-you-pour system.
Figure 7B:
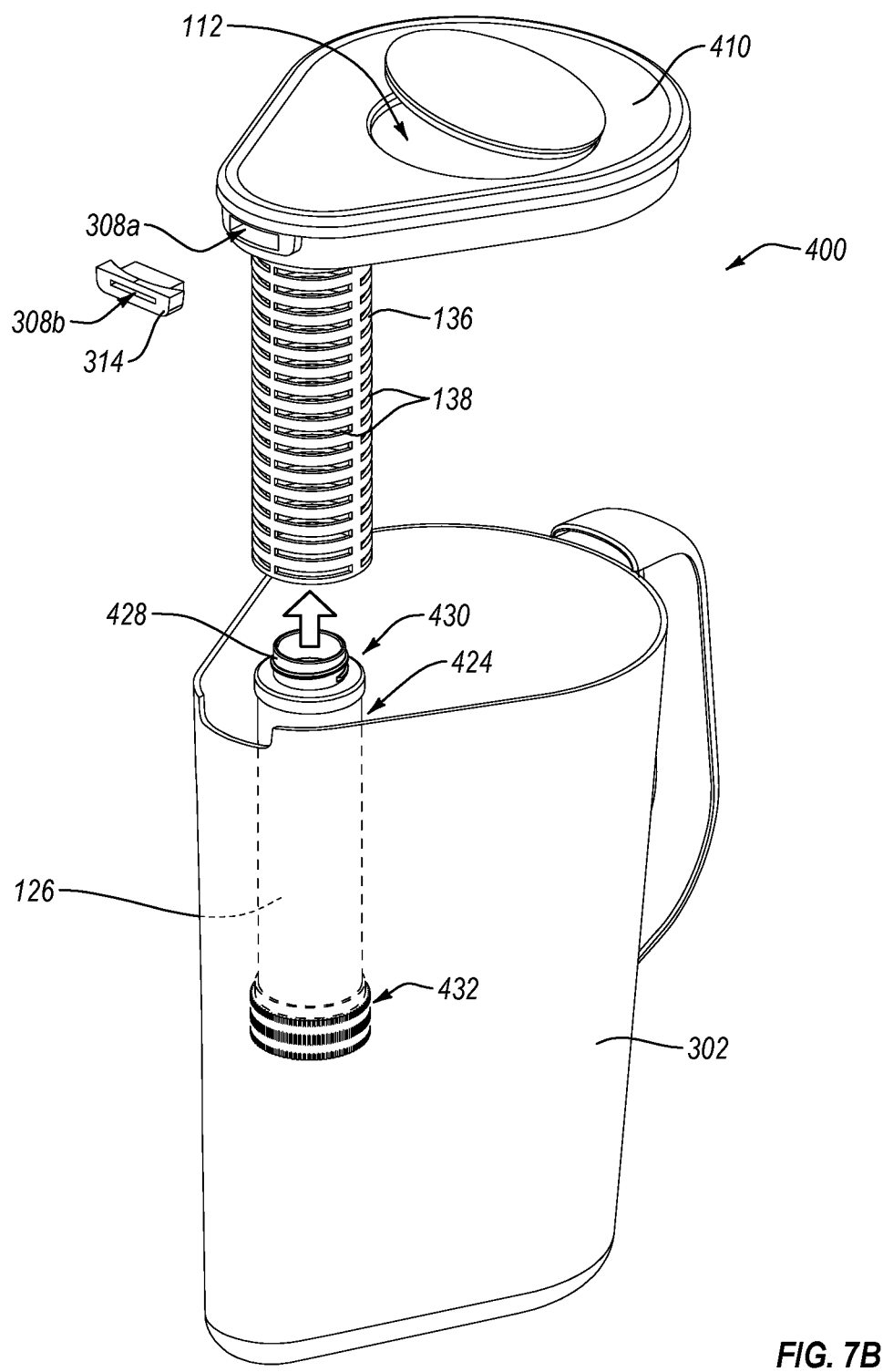
FIG. 7B is an exploded perspective view illustrating another exemplary embodiment of a filter-as-you-pour system.
Figure 7C:
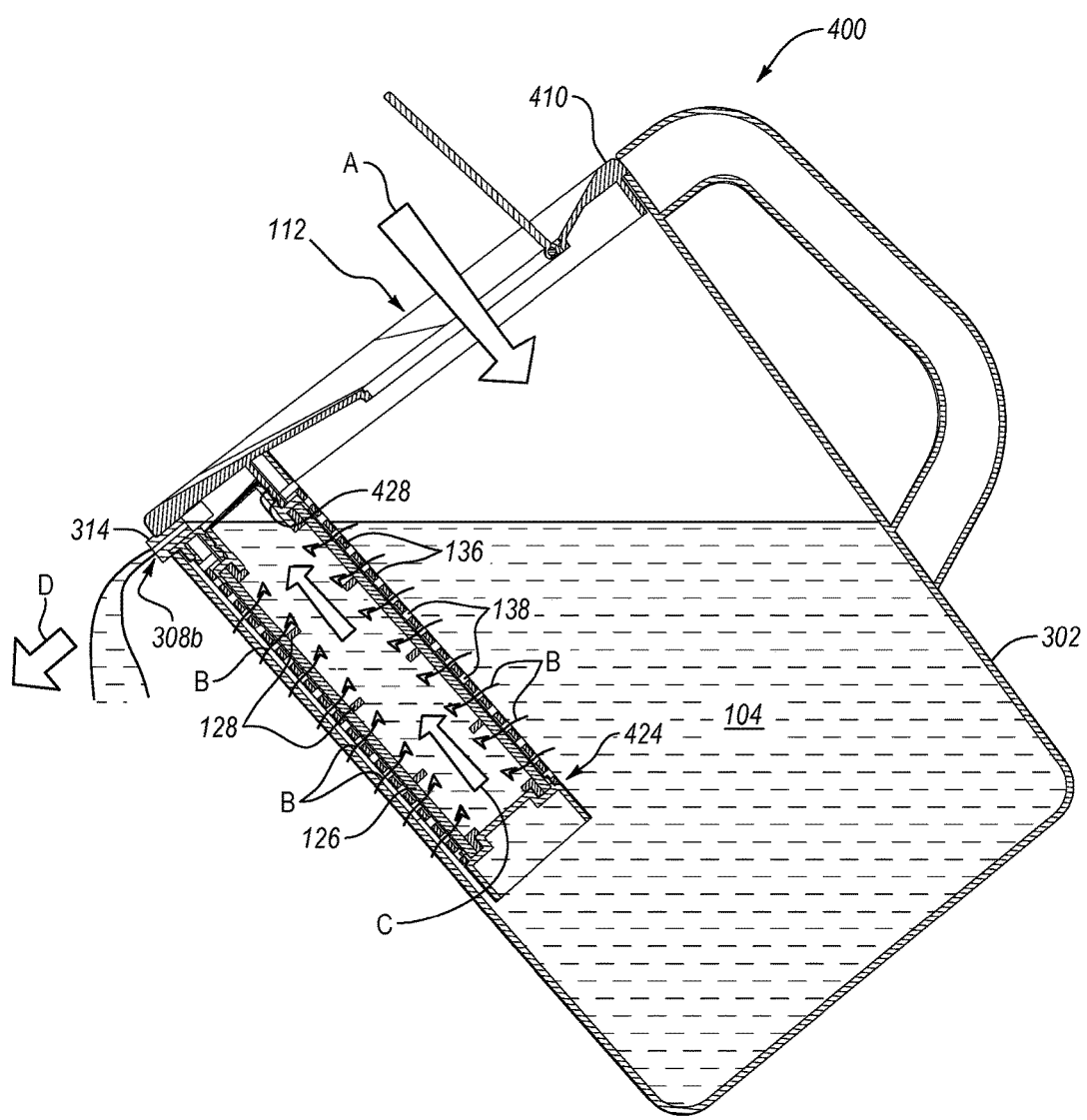
FIG. 7C is a cross-sectional schematic view through an assembled filter-as-you-pour system similar to that of FIG. 4B, showing the flow of water in and out of the system.

FIGS. 7A-7B illustrates an exemplary configuration where the filter assembly may be inserted from the top down, or from the bottom up, respectively. Both configurations shown in FIGS. 7A-7B include a particular lid and spout configuration that permit exiting water to flow out of the system in a direction that is radial relative to the filter assembly. FIG. 7C illustrates a cross-section through the system of FIG. 7B.

As seen in FIG. 7A, a system 300 may include a container body 302, a lid body 310, and a filter assembly 324, which may be inserted from the top down (e.g., dropped down) into casing or shell 136, which includes slots 138. Filter assembly 324 may be trapped between a bottom of casing or shell 136 and lid body 310, upon insertion therein. For example, a top end of filter assembly 324 may snap into or otherwise be secured into lid body 310. A top end of shell 136 may be threaded, snapped, or similarly secured into lid body 310. In another embodiment, the filter assembly 324 could be screwed or similarly secured (e.g., snapped) into a bottom of shell 136, etc. An opening 334 not for exit of filtered water, but for insertion of filter assembly 324 may be provided (e.g., towards the forward end of) in lid body 310. Opening 334 is plugged or sealed upon insertion of filter assembly 324 into shell 136.

Filter assembly 324 may be similar to assembly 124 of FIG. 4A, e.g., including a core about which textile filter media material 126 is wrapped, providing a generally cylindrical shape. The top end 330 of filter assembly 324 may be somewhat differently configured than assembly 124, e.g., so as to provide for exit of filtered water in a radial or lateral direction, rather than coaxial with the longitudinal axis of the assembly 324. For example, within the interior of filter assembly 324, the top end 330 may be closed, while outlet 308 for exiting filtered water may be provided in a lateral side of top end 330 of filter assembly 324. A corresponding outlet portion 308a may also be provided in lid body 310, in-line with outlet 308 of filter assembly. So that filtered water exiting filter assembly 324 through outlet 308 then enters outlet portion 308a of lid body 310. A spout 314 may be inserted including another outlet portion 308b may be inserted and retained within outlet portion 308a, so that filtered water exiting outlet 308 flows through outlet portions 308a and 308b, then exiting the system 300.

Spout 314 may be configured (e.g., in cross-sectional area, other geometric characteristics, etc.) to serve as a flow control device, to regulate flow out of system 300 to a desired flow rate, as described herein. Spout 314 may redirect filtered water flow exiting axially from the filter assembly, and may control and ensure water exits along a guided flowpath. The interior pathway defined by spout 314 (e.g., outlet 308, 308a, and to 308b) may be tapered in cross-sectional area and/or width, narrowing towards exit 308b. Such a spout 314 has been found to be helpful in providing consistent flow rates over the volume of water dispensed by the container body (e.g., so that the flow rate when dispensing the first cup from a full container is substantially equal to the flow rate when dispensing the last cup from a nearly empty container. For example, flow rates may be within ±30%, ±25%, ±20%, ±10%, or ±5%, over the entire volume of the container.

FIG. 7B illustrates a similar system 400 including a lid body 410 to which shell 136 may be secured. In the embodiment seen in FIG. 7B, filter assembly 424 may also be similarly configured to filter assembly 124, e.g., including a core about which textile filter media material 126 is wrapped, providing a generally cylindrical shape. Rather than being inserted from above as in FIG. 7A, the filter assembly 424 may be inserted into shell 136 from below. As shown, a top end 430 of filter assembly 424 may include threads 428 for threading filter cartridge 424 into corresponding grooves of lid body 410. Alternatively, top end 430 could snap into lid body 410. The bottom end 432 of filter assembly 424 may be provided with a ribbed outer surface to facilitate screwing of filter assembly 424 into lid body 410.

A spout 314 similar to that described in conjunction with FIG. 7A may also be provided, inserted within an outlet portion 308a in lid body 410, so that water exits system 400 through outlet 308b in a direction that is radial or lateral relative to the longitudinal axis of filter assembly 424 received within shell 136. For example, both FIGS. 7A and 7B illustrate configurations in which the water enters through an inlet 112 in a top of the lid body, but in which water exits the system in a lateral, perpendicular direction, rotated about 90° relative to inlet 112, rather than exhibiting an inlet and outlet that are parallel to one another (e.g., inlet 112 and outlet 108 of FIG. 1 are parallel to one another, while inlet 112 and outlet 308b of FIGS. 7A-7B are perpendicular to one another).

FIG. 7C shows a cross-sectional view through the assembled system 400 of FIG. 7B illustrating an exemplary flow path, similar to that shown in FIG. 3. The system 300 of FIG. 7A may include a similar flow path as that shown in FIG. 7C. As shown, unfiltered water may be introduced into container body 302 through inlet 112 (arrow A), flow into filter assembly 424 along a radial flow path as depicted by arrows B, through one or more layers of textile material filter media 126, which advantageously is disposed so as to present a curved, rather than perpendicular or planar surface to the stream of water. Once the water passes through layer(s) 126, the filtered water may then flow axially, as represented by arrows C, up towards outlet 308b. In order to exit outlet 308b, the filtered water is again turned, flowing laterally outward (arrow D). Before finally exiting outlet 308b, the filtered water may pass through any additional flow control device (e.g., a slit valve, grating, etc.) disposed adjacent the outlet.

Various other features of exemplary systems may be disclosed in one or more of the following patent applications, each filed the same day as the present application and herein incorporated by reference: U.S. patent application Ser. No. 15/038,982; U.S. patent application Ser. No. 14/569,397; U.S. patent application Ser. No. 15/038,996; U.S. patent application Ser. No. 15/038,998; U.S. patent application Ser. No. 15/039,008; and U.S. patent application Ser. No. 15/039,012.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A filter as you pour system comprising a flow control device for controlling flow of water through an outlet of the system, the system comprising:
    a container body defining an internal storage volume;
    a handle extending from the container body and configured to be grasped by a user to pour the water out of the container;
    a lid that is releasably attachable over the container body;
    a system outlet, wherein a stream of water is operable to exit the container through the system outlet due to gravity;
    a filter assembly attachable to at least one of the lid or the container body, the filter assembly being disposed so as to be in a flow stream of the water as the water is poured out of the container body through the system outlet of the system so that the stream of water exiting through the system outlet is simultaneously filtered as the water is poured from the container body, wherein the filter assembly includes a filter media that extends around a longitudinal axis; and
    a flow control device, in addition to the filter assembly, wherein the flow control device is disposed at the system outlet and configured to regulate an exit flow rate of water being poured through the system outlet;
    wherein the flow control device includes a slit valve in the system outlet formed of an elastomeric material having at least a first side and a second side separated by a slit, wherein the slit of the slit valve is forced open by the flow stream and weight of the water;
    wherein the slit valve homogeneously regulates flow of water through the system outlet to provide a more consistent flow rate out of the system outlet.

2. The filter as you pour system of claim 1, wherein filter assembly comprises:
    a core frame member; and
    the filter media is an activated carbon textile material that is wrapped around and in contact with the core frame member to present an annular curved surface to the flow stream of water.

3. The filter as you pour system of claim 2, wherein filter media aids in regulating the exit flow rate of water poured through the system outlet, such that the exit flow rate of the water is from about 0.3 GPM to about 3 GPM.

4. The filter as you pour system of claim 3, wherein the filter media of the filter assembly comprises a single layer of activated carbon textile material.

5. The filter as you pour system of claim 3, wherein the filter media of the filter assembly comprises two layers of textile material, at least one of the layers comprising the activated carbon textile material.

6. The filter as you pour system of claim 3, wherein the filter media of the filter assembly does not comprise granulated activated carbon, a block of activated carbon, or a foam.

7. The filter as you pour system of claim 3, wherein the filter assembly includes the core frame member and a shell and is cylindrical and the activated carbon textile material extends around the core frame member to present the curved surface between the core frame member and the shell, and the flow stream of water is operable to pass through the filter media at an angle relative to the longitudinal axis through the filter media.

8. The filter as you pour system of claim 1, wherein the exit flow rate of the water is from about 0.5 GPM to about 0.8 GPM.

9. The filter as you pour system of claim 1, wherein the flow control device further comprises a spout that redirects the flow stream of water from a direction that is coaxial with the longitudinal axis of the filter assembly to a direction that is generally perpendicular to the longitudinal axis of the filter assembly.

10. The filter as you pour system of claim 9, wherein the spout has an interior wall that forms a tapered cross-sectional area within the spout.

11. The filter as you pour system of claim 1, wherein the filter assembly further comprises a core frame member that is cylindrical and includes an open terminal end through which the flow stream of the water passes prior to engaging the flow control device.

12. The filter as you pour system of claim 1, wherein regulation of the flow of water through the system outlet is further regulated, in addition to the regulation by the flow control device, by the filter media of the filter assembly, the filter media comprising an activated carbon textile material that presents a curved surface to the flow stream of water.

13. The filter as you pour system of claim 1, wherein the container body comprises a pitcher body having the handle, the system outlet of the system comprising a pouring spout in at least one of the lid or container body, the flow control device being disposed within the pouring spout to regulate the exit flow rate of water being poured through the pouring spout.

14. The filter as you pour system of claim 1, wherein the filter assembly further comprises:
  a core frame member extending along the longitudinal axis; and
the filter media is wrapped around the core frame member to present a curved surface to the flow stream of water, wherein the curved surface extends around the longitudinal axis and the flow stream of water is operable to pass through the filter medial at an angle relative to the longitudinal axis through the filter media.

15. The filter as you pour system of claim 1, wherein the outlet has a diameter and the slit of the slit valve runs generally across the diameter of the outlet.

16. The filter as you pour system of claim 15, wherein the slit of the slit valve is axially aligned with a tapered spout portion following the outlet.

17. The filter as you pour system of claim 1, wherein the slit of the slit valve includes a first slit and a second slit, the first slit being coaxial with a longitudinal axis of a tapered spout portion and the second slit oriented perpendicular to the longitudinal axis of the tapered spout portion.

18. A filter as you pour system comprising a flow control device for controlling flow of water through an outlet of the system, the system comprising:
  a container body defining an internal storage volume;
  a handle extending from the container body and configured to be grasped by a user to pour the water out of the container;
  a lid that is releasably attachable over the container body, the lid defining the outlet through which water within the container body may be poured;
  an inlet into the container body and spaced away from the outlet;
  a substantially cylindrical elongated filter assembly having a shell, a filter media and an inner frame, the elongated filter assembly attached to the lid, the filter media wrapped around the inner frame and attached to an end of the shell, the filter assembly being disposed in a flow stream of the water stored within the container body as the water is poured out of the container body through the outlet so that the flow stream of water passing through the shell, the filter media, and the inner frame and exiting through the outlet is simultaneously filtered as the flow stream of water is poured from the container body due to gravity;
  a flow control spout disposed inserted into the outlet to regulate and provide a substantially consistent exit flow rate of the flow stream of water being poured through the outlet; and
  wherein the filter media of the filter assembly comprises an activated carbon textile material that presents a curved surface to the flow stream of water due at least in part to being wrapped around the inner frame, the activated carbon textile material aiding in regulating the exit flow rate of the flow stream of water exiting the outlet due to gravity and poured through the outlet, such that the exit flow rate of the water is from about 0.3 GPM to about 2 GPM.

19. The filter as you pour system of claim 18, wherein the filter media of the filter assembly comprises at least one layer of activated carbon textile material;
  wherein the filter assembly is spaced apart from the flow control spout.

20. The filter as you pour system of claim 19, wherein the filter media of the filter assembly comprises two layers of textile material, at least one of the layers comprising the activated carbon textile material.

21. The filter as you pour system of claim 18, wherein the flow control spout is tapered in a cross-sectional area to narrow toward an exit of the spout.

22. The filter as you pour system of claim 21, wherein the flow control spout is configured so that the flow rate through the spout is substantially equal when dispensing a first cup of water or a last cup of water from the container body.

23. A method of filtering water as water is poured from a filter as you pour system, the method comprising:
  providing a container body defining an internal storage volume to store water;
  releasably attaching a lid over the container body;
  filling the container body at an inlet into the container body without filtering as the container body is filled;
  providing a flow control device to control a flow rate of the water as the water is poured out an outlet that is spaced away from the inlet due to gravity;
  positioning the flow control device at the outlet;
  filtering the water through a filter assembly as the water is poured out of the system due to gravity; and
  forcing open a slit valve of the flow control device by a flow stream and weight of the water to homogenously regulate an exit flow rate of the water from the system due to gravity with the flow control device and causing a consistent flow rate of the water as the water flows through the slit valve and out the outlet.

24. The method of claim 23, wherein the provided flow control device automatically homogenously regulates an exit flow rate of the water from the system as a whole.

* * * * *